United States Patent Office 3,149,174
Patented Sept. 15, 1964

3,149,174
PRODUCTION OF OLIGOMERS OF 1,3-DIENES
Herbert Mueller, Frankenthal, Pfalz, Germany, assignor to Badische Anilin- & Soda-Fabrik Aktiengesellschaft, Ludwigshafen (Rhine), Germany
No Drawing. Filed Dec. 21, 1962, Ser. No. 246,345
Claims priority, application Germany, Mar. 24, 1959, B 52,584; July 16, 1959, B 54,034; Jan. 13, 1960, B 56,218
13 Claims. (Cl. 260—666)

This invention relates to a process for the production of oligomers of 1,3-dienes in the presence of a catalyst. More specifically, the invention relates to a process for the production of oligomers of 1,3-dienes in which a new catalyst system is used. The present application is a continuation-in-part of applications Serial No. 15,844, filed March 18,1960, and Serial No. 81,268, filed January 9, 1961, both of which are now abandoned and the disclosures of which are incorporated herein by reference as fully as if set forth in their entirety.

The term "oligomers" as used in this specification is meant to include both open-chain and cyclic compounds in which the molecules consist of a small number of 1,3-diene molecules. The oligomers may, for example, contain from 2 to 10 1,3-diene molecules. The oligomers of 1,3-dienes have boiling temperatures of up to 150° C. at $10^{-7}$ mm. Hg.

It is known that aluminum alkyls or alkylaluminum chlorides and chromium halides or titanium halides can be used for the preparation of catalyst systems which convert 1,3-dienes into cyclic hydrocarbons, such as cyclododecatriene-(1,5,9) or cyclooctadiene-(1,5). In conversion processes of this type, there are also obtained high molecular weight, partly rubberlike, non-distillable polymers. These polymers, while not soluble, are swellable in the diluents used and turn the reaction mixture into a highly viscous mass which is difficult to handle and, above all, interferes with continuous operation of the processes.

Another disadvantage of the conventional processes and catalysts resides in the fact that readily flammable and air-sensitive organoaluminum compounds are required. A further disadvantage consists in the fact that in some cases relatively difficultly obtainable chromium halides are necessary. It is true that the yields are quite good in many cases; just as frequently, however, they are unsatisfactory. The space-time yields obtainable by the known methods are also not entirely satisfactory.

It is an object of the present invention to provide a process by which 1,3-dienes can be converted into their oligomers without the competitive and concurrent formation of appreciable amounts of troublesome high molecular weight byproducts. Another object of the invention is to carry out the process with a catalyst system in the preparation of which organoaluminum compounds and chromium compounds are unnecessary. A further object of the invention is to provide a process for the conversion of 1,3-dienes into their oligomers by which the latter are obtained in better yields and space-time yields than by conventional methods.

In accordance with the present invention these and other objects and advantages are achieved by carrying out the oligomerization of a 1,3-diene with a catalyst system which is obtainable from (a) A ferric halide or a titanium compound;
(b) At least one metal of Group IA, IIA, IIB, IIIA, IIIB, IVA, IVB, VB or VIIB of the Periodic Chart of the Elements, and
(c) At least one halide of an element of Group IIB, IIA, IVA or VA of the Periodic Chart of the Elements. In this system, either the metal of group (b) must be aluminum and/or the halide of group (c) must be an aluminum halide, i.e., the presence of aluminum in elementary or combined form or both is essential.

In many cases, it is advantageous to coemploy with the catalyst system a substance which forms complex compounds with the halides of group (c). Coemployment means adding these complex-forming compounds before, during or after preparing the catalyst system from components (a), (b) and (c).

In the new process there are formed cyclic trimers of 1,3-dienes besides a small amount of cyclic dimers such as cyclooctadiene - (1,5) and 1 - vinylcyclohexene - (3). These substances are hereinafter referred to as lower oligomers. Moreover, there are formed higher molecular weight oligomers of the initial materials, some liquid, some waxy, which dissolve readily in the common solvents and which are hereinafter referred to as higher oligomers. They are higher homologs of cyclic trimers or similar compounds.

The said higher oligomers of 1,3-dienes dissolve in the usual solvents, e.g., benzene, chlorobenzenes, trichloroethylene or cyclohexane, without appreciably increasing the viscosity of the reaction mixture. Rubber-like polymers are observed in negligible amounts if at all. For this reason, the new process is especially suitable for continuous operation. A further advantage of the process resides in the fact that by variation of the catalyst components it is possible to obtain either the cyclic trimers of the initial material or the said higher oligomers which are also important intermediates.

1,3-dienes which are suitable as initial materials include isoprene, 2,3 - dimethylbutadiene - (1,3), cyclohexadiene-(1,3) and butadiene-(1,3). The preferred initial materials are butadiene-(1,3) and butadiene-(1,3) substituted with one or two methyl groups. The dienes need not be pure and may be used in admixture with substances which are inert under the conditions of the process. Thus, for example, a gas mixture obtained by dehydrogenation of butane or butene may be directly used for the reaction.

Suitable titanium compounds include: titanium(IV) esters of the formula $Ti(OR)_4$ where R is a saturated hydrocarbon radical; titanium halides; titanium(IV) ester halides of the formula $Ti(OR)X_{4-n}$, where R is defined as above, X is halogen and $n$ an integer from 1 to 3; and also organotitanium halides.

Of the titanium(IV) esters, those are preferred which are derived from saturated aliphatic alcohols (preferably alkanols) with 1 to 10, preferably 1 to 4, carbon atoms, or from saturated cycloaliphatic alcohols, preferably cycloalkanols with 5 to 10 carbon atoms. Such esters include titanium tetramethylate, titanium tetraethylate, titanium tetrapropylate, titanium tetrabutylate, titanium tetraoctylate, titanium tetracyclohexylate and titanium tetracyclooctylate.

The titanium halides are derived from trivalent or advantageously from tetravalent titanium. Suitable titanium halides include titanium(III) chloride, titanium(III) bromide, titanium(IV) bromide, titanium(IV) fluoride, titanium(IV) iodide and titanium(IV) chloride. Being readily accessible, titanium(IV) chloride is the preferred titanium compound for the production of the catalyst system for the new process.

The preferred titanium(IV) ester halides are derived from the said halides, especially from the chlorides, on the one hand, and from the above-mentioned saturated aliphatic alcohols or saturated cycloaliphatic alcohols on the other hand. Suitable titanium ester halides include diethoxy titanium dichloride, triethoxy titanium monochloride and tricyclohexyloxy titanium monochloride.

Organo-titanium halides may also be used, i.e., compounds in which there are present, in addition to the halogen, one to three organic radicals, preferably alkyl radicals with 1 to 4 carbon atoms, attached to the titanium by way of a carbon atom. Examples of such compounds are methyltitanic trichloride and cyclopentadienyl titanium trichloride. Organo-titanium halides which have united with metal halides to form complexes are also suitable titanium compounds for the process according to the present invention, for example, $C_6H_5TiCl_2 \cdot AlCl_3$ and $C_6H_5TiCl_2 \cdot 2AlCl_3$.

Furthermore, it is possible to use iron(III) halides, preferably iron(III) chloride, instead of titanium compounds. Obviously, mixtures of iron(III) halides and titanium compounds can be used.

Of the metals to be used as component (b), lithium, sodium, potassium, beryllium, magnesium, calcium, strontium, barium, boron, aluminum, gallium, indium, thallium, lead, titanium, vanadium, manganese and cerium are preferred. Alloys or mixtures of two or more of the said metals may also be used.

Of the halides to be used as component (c), it is preferred to use the chlorides and bromides. Iodides may, however, also be used with good results. Suitable compounds include boron trichloride, aluminum trichloride, aluminum tribromide, aluminum iodide, gallium tribromide, indium tribromide, thallium chloride, carbon tetrachloride, silicon tetrachloride, tin tetrachloride, zinc chloride, zinc iodide, cadmium chloride and antimony trichloride. Obviously, mixtures of these halides may also be used.

If a halogen-containing compound (a) is used and the metal of group (b) is aluminum, then aluminum halide is at least partly formed in situ. In this case, addition of a halide (c) is recommended but not essential.

The amounts in which the components—(a) titanium compound or iron(III) halide, (b) metal and (c) halide—are used in the preparation of the catalyst may be varied within wide limits. Good results are obtained, for example, with ratios of (a) to (b) to (c) in the range of 1:300:100 to 1:10:10. The amounts of (a) and (c) are expressed in moles which, in the case of the metals (b), the redox equivalents, i.e., the atomic weight divided by the valency, are used, the calculation being based on the assumption that the metal passes into the most stable oxidation stage.

The catalyst need only be used in small amounts with reference to the 1,3-diene. The reaction proceeds at a satisfactory rate with an amount of, for example, 0.3% by weight with reference to the 1,3-diene to be reacted. Generally speaking, good results are achieved with 0.05 to 5% by weight. However, it is also possible to use larger amount of catalyst.

By adding complex-forming substances, i.e., substances which form complex compounds with the halides used, it is possible in many cases to promote the formation of the cyclic trimers of the initial materials at the expense of the formation of the higher oligomers. The complex-forming compounds are capable of either filling up any electron gaps in the halide compound or of saturating coordinatively the central atoms of the halides.

Suitable complex-forming compounds for the purposes of this invention include the salts of alkali and alkaline earth metals, in particular their halides, hydrides and salts derived from fatty acids with 1 to 4 carbon atoms as well as compounds of oxygen, nitrogen, phosphorus and sulfur containing a single electron pair, such as ethers, thioethers, amines, and organic phosphines. The structure of the organic additives is not critical. The only requirement is that in addition to the groups characteristic of the said classes of substances (—O—, —N=, —P= or —S—) they should either have hydrocarbon structure or contain one or more additional atoms and/or groups which are attached to carbon atoms and which are inert under the conditions of the process. Such atoms and groups include halogen atoms attached to an aromatic ring, and carbonyl, carboxyl, cyano and carbalkoxy groups.

For practical reasons, those amines, ethers, thioethers and organic phosphines are preferred which in addition to the group characteristic of the said classes, have only hydrocarbon structure and contain up to 20 carbon atoms.

The preferred alkali and alkaline earth metal salts are halides, hydrides, cyanides and salts of lower fatty acids with 1 to 4 carbon atoms.

Primary, secondary and tertiary amines are suitable for use as complex-forming additives. They may contain aliphatic, cycloaliphatic, araliphatic and/or aromatic radicals. The amino nitrogen atom may also form part of a heterocyclic ring which may contain one further hetero atom, for example, oxygen, nitrogen or sulfur. Suitable amines include methylamine, dimethylamine, trimethylamine, butylamine, dicyclohexylamine, stearylamine, cyclooctylamine, cyclododecylamine, aniline, N-methylaniline, N,N-dimethylaniline, naphthylamine, pyridine, quinoline, piperazine, oxazoline, thiazole and carbazole.

The ethers, thioethers and organic phosphines which are suitable for use as complex-forming additives may also contain aliphatic, cycloaliphatic, araliphatic and/or aromatic radicals. The characteristic atom (—O—, —S— or —P=) may also form part of a heterocyclic ring. Suitable compounds of this kind include diethyl ether, diphenyl ether, anisole, p-chloroanisole, glycolic acid methyl ester methyl ether, glycolic acid nitrile methyl ether, dibutyl ether, tetrahydrofuran, dioxane, diphenylene oxide, diethyl sulfide, dibenzyl sulfide, triphenylphosphine, triethylphosphine, thiomorpholine and 1,4-dithiacyclohexane.

It is of course also possible to add two or more of the complex-forming additives at the same time or to use a single compound which contains two or more of the said characteristic groups, for example, a compound which is both an amine and a thioether, such as thiomorpholine or phenothiazine.

The complex-forming compounds are advantageously used in such amounts that the mole ratio of the sum of halogen compound+titanium compound or iron halide to the complex-forming compound lies within the limits of 1:0.1 to 1:3, preferably 1:0.2 to 1:3. The most favorable ratio can be readily determined by a preliminary experiment.

Suitable diluents in the presence of which the process may be carried out include inert organic solvents such as benzene, toluene, xylene, ethylbenzene, cumene, chlorobenzene, heptane, cyclohexane and isooctane, or a liquid reaction product such as cyclododecatriene-(1,5,9). It is recommended to use anhydrous and carefully purified solvents. Aromatic hydrocarbons with a molecular weight up to 150 are preferred. Solvent mixtures may also be used with good results, for example those which contain mainly chlorobenzene, heptane or cyclohexane and, in a smaller amount, benzene or toluene. In general, the diluent is used in an amount which is about 0.2 to 5 times the amount of 1,3-diene.

The process may be carried out within a wide temperature range, namely between about $-50°$ and $+150°$ C. The preferred reaction temperature lies between $20°$ and $100°$ C.

The process according to this invention is as a rule carried out at atmospheric pressure, but it is also possible to work at reduced or increased pressure. Increased pressure is often necessary, for example, up to 10 atmospheres, especially when using low-boiling initial materials or diluents and elevated reaction temperatures. The catalyst is formed by mixing the components specified. In carrying out the process, it is advantageous first to develop the catalyst by intimately mixing (a) the titanium compound or the iron halide, (b) the metal—for example in the form of powder, chips or cuttings—and (c) the halide, preferably in the diluent selected for the reaction and in the atmosphere of an inert gas, such as nitrogen or argon, for some time, for example 10 hours. Mixing may, for example, be carried out in a ball mill or a vibratory mill. The optimum duration of the mixing depends inter alia on the components used and may be readily ascertained by a preliminary experiment. It should be noted that the activity of the catalyst may be decreased by mixing for too long a period. The catalyst may also be developed advantageously by mixing only one or two of the catalyst components, for example the metal and/or the halogen compound with the diluent chosen, the dispersion thus obtained being united with a solution or a dispersion of the titanium compound. Finally, the catalyst components may be introduced into a solvent and the 1,3-diene added immediately with intimate mixing, for example with a high efficiency stirrer.

An especially recommendable method of preparing the catalyst system comprises mixing the catalyst components in the presence of an olefine, diolefine, triolefine or tetraolefine or of an acetylene as activator. The terms olefine, diene, triolefine, tetraolefine and acetylene are to be interpreted in a broad sense. Those compounds are preferred which have an unsaturated hydrocarbon structure and contain up to 20 carbon atoms. It is also possible to use compounds with this number of carbon atoms which in addition contain atoms or groups which are inert under the reaction conditions, i.e., do not, or do not substantially, impair the course of the reaction. Such atoms or groups include ether bridges, carboxylic ester groups, nitrile groups, carboxylic amide groups, amino and imino groups, epoxy and sulfide groups.

Suitable olefines include ethylene, isobutene, octadecene-(1), cyclohexene, cyclododecene, styrene, allylbenzene, isopropenylbenzene, ethyl acrylate, ethyl oleate, acrylonitrile, diallyl ether, vinyl acetate, allyl methyl sulfide, 1,2-epoxy-cyclooctene-(5), N,N-dimethyl-allylamine, N-isopropylacrylamide and methylacrylamide.

Polyolefines containing 2 to 4 double bonds and acetylene compounds containing 1 or 2 carbon triple bonds show a particularly pronounced activating effect. Suitable polyenes are for example cyclooctadiene-(1,5), cyclododecatriene-(1,5,9), 3,3-dimethyl-pentadiene-(1,4), bicyclo-[2,2,1]-heptadiene-(2,5), 1-methoxybutadiene-(1,3), ethyl muconate, cyclooctatetraene, 1,2-epoxy-3-methyl-heptadiene-(4,6), divinylacetylene, allene, 1,3,5-trivinylcyclohexane and furan. It is particularly advantageous to employ as activator the 1,3-diene which is to be oligomerized in the subsequent reaction.

Suitable acetylene compounds are for example: acetylene, vinylacetylene, methylacetylene, dimethylacetylene, phenylacetylene, diphenylacetylene (tolane), ethylpropiolate and octadecyne-(1).

The activator is preferably employed in a molar proportion to the titanium and/or iron compound of about 1:1 or higher. It is thus possible for example to employ a considerable excess of the 1,3-diene which is to be oligomerized. The excess is then converted into oligomers which act as solvent or diluent. If a liquid polyene, such as cyclododecatriene-(1,5,9) which cannot be oligomerized, or liquid olefine or acetylene compound, is employed in excess, then this excess acts as diluent. If only a small proportion of activator is employed, e.g., up to 10 moles per mole of titanium and/or iron compound, or if the activator is solid, then it is advisable to add an inert diluent as mentioned above. The diluent or the olefinic or acetylenic compound when used in excess is employed in a proportion of 10 to 100 times the amount of titanium or iron compound.

Activated catalyst systems can be kept for several days without suffering any loss in activity.

The 1,3-diene is led into the catalyst mixture thus obtained as a suspension whereupon the oligomerization reaction starts with considerable evolution of heat. The desired reaction temperature is maintained by appropriate supply of initial material and if necessary by external cooling. To complete the reaction, the temperature is preferably maintained for some time after the supply of the initial material has ended. Then the catalyst is destroyed, for example, by careful addition of a small amount of water or an alcohol, such as methanol or ethanol or by adding a large amount, e.g., 2 to 4 times the quantity of the reaction mixture, of acetone to the reaction mixture, whereby small amounts of polymers are separated. If decomposition of the catalyst is carried out with alcohol or water, it is recommended first to add to the mixture a small amount of another substance which contains a single electron pair. Ketones, ethers, ammonia, amines, acid amides, esters and sulfides are for example suitable for this purpose. The mixture is then worked up after decomposition of the catalyst in the usual manner, for example by extraction with water and distillation of the organic phase after its separation from the aqueous phase, or, if decomposition has been carried out with alcohol or water, by distillation after separation of the solid components.

The process may also be carried out continuously without difficulty, for example, in a tubular coil to which the catalyst suspended in a diluent is supplied continuously at one end and into which the diene is forced continuously and simultaneously at the same end. The reaction mixture leaving the coiled tube at the other end has methanol added to it continuously to decompose the catalyst and the product is then fed to a continuously operating distillation column.

The hydrocarbons obtainable according to the process are valuable intermediates for organic syntheses. Cyclododecatriene-(1,5,9) can be hydrogenated and the resulting cyclododecene or cyclododecane can be converted into cyclododecanone oxime which can be rearranged to ω-laurolactam, a valuable compound for the production of polyamides. The higher molecular weight materials, some liquid, some waxy, are for example suitable for the production of textile auxiliaries and mineral oil auxiliaries or as starting materials for the manufacture of lacquers and plastics. They can also be incorporated in quantities of from 2 to 20% by weight into polybutadiene or polyisoprene to facilitate the incorporation of carbon black prior to vulcanization.

The invention is illustrated by, but not limited to, the following examples. The parts are by weight.

EXAMPLE 1

1.14 parts of titanium tetrachloride, 2 parts of aluminum grit and 3 parts of aluminum chloride are ground for 4 hours in 90 parts of benzene in a ball mill. The catalyst suspension thus obtained is transferred under an argon atmosphere into an agitated vessel provided with a thermometer, a reflux condenser and a gas inlet pipe. Butadiene is led in in a rapid stream while stirring so that the temperature rapidly rises to 50° C. The reaction temperature is then kept between 50° and 60° C. by water cooling. After 30 minutes, 128 parts of butadiene has been absorbed by the catalyst solution. The mixture is stirred for another 30 minutes and then poured into 320 parts of acetone. 2 parts of polybutadiene insoluble in acetone is thus obtained. The acetone solution is extracted with water and the organic layer dried over calcium chloride and distilled.

There is obtained 90 parts, i.e., 75% of the theory, of cyclododecatriene-(1,5,9) with the boiling point 85° C. at a pressure of 7 mm. Hg ($n_D^{20}$ 1.5078) and 7 parts of higher molecular weight butadiene oligomers with the boiling point 120° to 150° C. at a pressure of $10^{-5}$ mm. Hg ($n_D^{20}$ 1.5100). Elementary analysis, infrared spectrum, hydrogenation iodine number and molecular weight show a cyclic hydrocarbon with the empirical formula $(C_4H_6)_6$ having 6 double bonds per molecule. The distillation residue is a dark colored oil which has a mean molecular weight of about 950 and a hydrogenation iodine number of 390. Elementary analysis gives a carbon content of 88.5% and a hydrogen content of 11.3%, which means that the oil consists of butadiene oligomers.

EXAMPLE 2

The procedure of Example 1 is followed, but chlorobenzene is used as the solvent instead of benzene. The yield of cyclododecatriene-(1,5,9) is 56% of the theory, higher oligomers are formed in a yield of 39% of the theory and only 5% of the butadiene reacted is converted into insoluble polybutadienes.

EXAMPLE 3

The procedure of Example 1 is followed but heptane is used as the solvent. The yield of cyclododecatriene-(1,5,9) is 50% of the theory and that of high-boiling unsaturated oligomers 8% of the theory.

EXAMPLE 4

A catalyst is prepared in the way described in Example 1 from 0.93 part of titanium trichloride, 2 parts of aluminum grit and 3 parts of aluminum chloride in 90 parts of benzene. 75 parts of butadiene is led into the mixture at 65° C. in the course of 2 hours. The mixture is worked up as described in Example 1, 35 parts of cyclododecatriene-(1,5,9), i.e., 47% of the theory, and 32 parts of polyunsaturated higher oligomers, i.e., 43% of the theory, being obtained. The oligomers for the most part pass over between 100° and 160° at $10^{-5}$ mm. Hg.

EXAMPLE 5

A catalyst is prepared in the way described in Example 1 from 1.14 parts of titanium tetrachloride, 8 parts of aluminum grit and 3 parts of aluminum chloride in 90 parts of benzene, 133 parts of butadiene is led into the mixture in the course of 40 minutes while cooling. After working up in conventional manner there is obtained 100 parts of cyclododecatriene-(1,5,9), i.e., 75% of the theory, and 30 parts of polyunsaturated higher oligomers, i.e., 23% of the theory. Less than 1% of insoluble polybutadiene is formed.

EXAMPLE 6

A catalyst suspension is prepared from 1.14 parts of titanium tetrachloride and 2 parts of aluminum grit in 90 parts of benzene by grinding in a ball mill for 4 hours. 96 parts of butadiene is reacted in the presence of this catalyst. By working up the reaction mixture there are obtained 42 parts of cyclododecatriene-(1,5,9) i.e., 44% of the theory, and 5 parts of polyunsaturated higher oligomers, i.e., 6% of the theory.

EXAMPLE 7

A catalyst is prepared in the way described in Example 1 from 1.14 parts of titanium tetrachloride, 2 parts of aluminum grit and 3 parts of aluminum chloride in 90 parts of benzene. 60 parts of isoprene is slowly added to the catalyst solution. An exothermic reaction occurs the temperature being kept at 50° C. by cooling. When all the isoprene has been added, the mixture is heated for another two hours at 50° C. to complete the reaction and then worked up as described in Example 1. There is obtained 36 parts of a mixture of isomeric isoprene trimers of the boiling point 130° to 150° C. at 7 mm. Hg and with the refractive index $n_D^{20}$ 1.5069. 20 parts of a highly viscous oil remains as a distillation residue.

EXAMPLE 8

A catalyst suspension is prepared in the way described in Example 1 from 1.36 parts of titanium tetraethylate, 2 parts of aluminum grit and 3 parts of aluminum chloride in 90 parts of benzene. The suspension is then saturated with butadiene within 45 minutes. By working up the mixture there are obtained 95 parts of cyclododecatriene-(1,5,9) and 9 parts of a pale brown oil.

EXAMPLE 9

A catalyst suspension is prepared in the way described in Example 1 from 1.14 parts of titanium tetrachloride, 2 parts of aluminum grit and 3 parts of aluminum chloride in a mixture of 80 parts of cyclohexane and 10 parts of benzene. Butadiene is led in for 2 hours and after working up the reaction solution there are obtained 35 parts of cyclododecatriene-(1,5,9) and 2 parts of a brown oil.

EXAMPLE 10

15 parts of aluminum chloride and 15 parts of aluminum grit are ground in 280 parts of benzene for 60 hours in a vibratory mill. 9 parts of the suspension formed is added to a solution of 1.4 parts of titanium chloride in 80 parts of benzene. While stirring vigorously, butadiene is led into the catalyst suspension for half an hour. By working up the mixture there are obtained 60 parts of cyclododecatriene-(1,5,9) and 5 parts of a mobile oil.

EXAMPLE 11

1.14 parts of titanium tetrachloride, 2 parts of aluminum grit and 90 parts of benzene are ground in a ball mill for 4 hours with an addition of 1 part of iodine for the formation of aluminum iodide. The further procedure of Example 1 is followed, cyclododecatriene-(1,5,9) being obtained in a yield of 85% of the theory with reference to butadiene reacted.

EXAMPLE 12

The procedure of Example 11 is followed but the iodine is replaced by 0.63 part of bromine. The yield of cyclododecatriene-(1,5,9) is 80% of the theory with reference to the butadiene reacted.

By using 0.16 part of hydrogen chloride instead of bromine, the yield of cyclododecatriene-(1,5,9) is 75% of the butadiene reacted.

EXAMPLE 13

1.14 parts of titanium tetrachloride, 2 parts of aluminum grit, 2 parts of aluminum chloride and 6 parts of diphenyl ether in 90 parts of benzene are ground in a vibratory mill for 4 hours. The catalyst suspension thus formed is transferred under an atmosphere of argon into an agitated vessel fitted with a thermometer, a reflux condenser and a gas inlet pipe. A powerful stream of butadiene is then led in while stirring, the mixture heating up rapidly. The temperature is kept at between 50° and 60° C. by cooling with ice-water. 168 parts of butadiene is absorbed within 30 minutes. The mixture is stirred for another 30 minutes and then 10 parts by volume of ether and 10 parts by volume of methanol are added. The hydrochloric acid formed by alcoholysis is bound by leading in ammonia. By distilling the mixture there are obtained 150 parts of cyclododecatriene-(1,5,9), i.e., 89% of the theory, and about 17 parts of higher molecular weight butadiene polymers which are however still soluble in acetone and which remain as a residue together with the residue of the catalyst. When working in the absence of diphenyl ether, the yield of cyclododecatriene-(1,5,9) is only 75%.

EXAMPLE 14

The procedure of Example 13 is followed but 1.8 parts of anisol is used instead of diphenyl ether. The yield of cyclododecatriene-(1,5,9) is 80% of the theory with reference to the butadiene used.

EXAMPLE 15

A catalyst is prepared by grinding for three hours in a vibratory mill, 2 parts of aluminum grit, 2 parts of aluminum chloride, and 1.14 parts of titanium tetrachloride in 90 parts of benzene. 2 parts of dry powdered sodium chloride is added to the suspension and 131 parts of butadiene is led in within 40 minutes at 50° C.

The further procedure of Example 13 is followed, 126 parts of cyclododecatriene-(1,5,9) being obtained, i.e., 96% of the theory. As a distillation residue there remain, besides the constituents of the catalyst, 3 to 5 parts of higher molecular weight products.

By proceeding in the absence of sodium chloride under otherwise identical conditions, cyclododecatriene is obtained in a yield of only 75% of the theory.

By following the procedure of Example 15 but using, instead of sodium chloride, other complex-forming compounds, the results shown in the following table are obtained.

*Table (Examples 16 to 24)*

| Example No. | Complex-forming compound | Yield of cyclododecatriene-(1,5,9) in percent of the theory |
|---|---|---|
| 16 | 2 parts of sodium fluoride | 79 |
| 17 | 2 parts of lithium chloride | 93 |
| 18 | 2 parts of potassium iodide | 90 |
| 19 | 2 parts of magnesium chloride | 86 |
| 20 | 2 parts of sodium hydride | 85 |
| 21 | 3 parts of diphenylene oxide | 78 |
| 22 | 1.5 parts of potassium cyanide | 79 |
| 23 | 2 parts of calcium chloride | 80 |
| 24 | 2 parts of quinoline | 85 |

EXAMPLE 25

A catalyst suspension is prepared as described in Example 15 from 1.14 parts of titanium tetrachloride, 2 parts of aluminum grit, 2 parts of aluminum chloride and 2 parts of sodium chloride in 8 parts of benzene and 80 parts of heptane. 174 parts of butadiene is then led into the mixture at 50° C. in the course of 1.5 hours. By working up in conventional manner there is obtained 120 parts of cyclododecatriene-(1,5,9). This is a yield of 69% of the theory. By working in the absence of sodium chloride, cyclododecatriene is obtained in a yield of only 50%.

EXAMPLE 26

The procedure of Example 15 is followed, but 56 parts of isoprene is used instead of butadiene. The yield of isoprene oligomers is 72% of the theory (boiling point 112° to 145° C. at 8 mm. Hg; $n_D^{20}$ 1.5080).

By working in the absence of sodium chloride, only 60% of isoprene feed is converted into distillable oligomers.

EXAMPLE 27

The procedure of Example 15 is followed but no aluminum chloride is used in the preparation of the catalyst. The yield of cyclododecatriene-(1,5,9) is 70% of the theory. By working in the absence of sodium chloride only 44% of the butadiene is converted into cyclododecatriene-(1,5,9).

EXAMPLE 28

A catalyst suspension is prepared as in Example 1 from 90 parts of benzene, 2 parts of aluminum grit, 2 parts of aluminum chloride and 1.14 parts of titanium tetrachloride by grinding for three hours in a vibratory mill. 2.4 parts of diphenyl sulfide is added to the mixture and butadiene is led in for 30 minutes at 50° to 60° C., 177 parts of butadiene being absorbed. The reaction mixture is worked up in conventional manner. 150 parts, i.e., 85% of the theory, of cyclododecatriene-(1,5,9) is obtained.

EXAMPLE 29

A catalyst suspension is prepared from 90 parts of benzene, 2 parts of aluminum grit, 2 parts of aluminum chloride and 1.14 parts of titanium tetrachloride as in Example 1 by grinding for three hours in a vibratory mill. 0.5 part of diethyl ether is then added to the suspension and butadiene is led into the mixture at 55° C. for 90 minutes. 150 parts of butadiene is reacted. After working up the reaction mixture in conventional manner, 122 parts of cyclododecatriene-(1,5,9) and 20 parts of higher molecular weight butadiene oligomers are obtained. The latter are readily soluble in benzene.

EXAMPLE 30

A catalyst suspension is prepared as in Example 15 from 1.14 parts of titanium tetrachloride, 2 parts of aluminum grit and 2 parts of aluminum chloride in 90 parts of benzene. 1.5 parts of powdered sodium acetate is added and butadiene led in for 35 minutes at 50° C. The reaction mixture is worked up in conventional manner, 142 parts of cyclododecatriene-(1,5,9), i.e., 81% of the theory with reference to the butadiene reacted, being obtained.

EXAMPLE 31

4.8 parts of iron (III) chloride, 6 parts of aluminum grit, 6 parts of aluminum chloride and 400 parts of benzene are ground for 15 hours in a vibratory mill and then 1.5 parts of powdered sodium chloride is added. The catalyst suspension is saturated with butadiene and stirred for 15 hours at room temperature. The reaction product has 600 parts of acetone added to it and the deposited catalyst constituents are filtered off. Simultaneously with the inorganic catalyst constituents, about 1 to 2 parts of polybutadiene insoluble in acetone are separated. The acetone solution is washed with water, dried over calcium chloride and the mixture is distilled. Distillation yields 30 parts of cyclic butadiene oligomers composed mainly of an equimolecular mixture of trans, trans, trans- and trans, trans, cis-cyclododecatriene-(1,5,9), a small amount of an alicyclic hydrocarbon containing a vinyl group and having the empirical formula $(C_4H_6)_3$, and 15 parts of cyclic butadiene aligomers with a boiling point of 90° to 120° C. at $10^{-4}$ mm. Hg. Elementary analysis, molecular weight and hydrogenation iodine nummber show this fraction to be a hydrocarbon with the empirical formula $(C_4H_6)_6$.

7 parts of higher molecular weight butadiene aligomers remains as a residue.

EXAMPLE 32

A catalyst suspension is prepared by grinding 1.3 parts of $ClTi(OC_2H_5)_3$, 2 parts of aluminum grit and 4 parts of aluminum chloride in 90 parts of benzene in a vibratory mill for three hours. After adding 1 part of pulverulent common salt, butadiene is introduced for 30 minutes at 50° C., 123 parts of butadiene being absorbed.

The catalyst is then destroyed by blowing air in and adding some methanol and the reaction product is distilled. There are obtained 113 parts of cyclododecatriene-(1,5,9), i.e., 92% of the theory, and 10 parts of a soft wax as a residue.

EXAMPLE 33

A catalyst suspension is prepared as described in Example 32 from 1.75 parts of titanium tetrabutylate, 2 parts of aluminum grit, 3 parts of aluminum chloride, 90 parts of benzene and 0.5 part of sodium chloride, and 70 parts of butadiene is introduced into the catalyst suspension. After stirring for one hour, the reaction mixture is poured into 400 parts of acetone, 8 parts of polybutadienes which are insoluble in acetone being precipitated. From the acetone solution the acetone is removed by a water wash. The residual organic phase is dried over calcium chloride and distilled. There are obtained 39 parts of cyclododecatriene-(1,5,9) and 10 parts of higher molecular weight butadiene oligomers with a boiling point of 120° to 140° C. at a pressure of $10^{-5}$ mm. Hg ($n^{20}_D$ 1.509). Elementary analysis, infrared spectrum, molecular weight and hydrogenation iodine number of these oligomers show a bicyclic hydrocarbon with the molecular formula $(C_4H_6)_6$ with five double linkages. As distillation residue there remains 13 parts of a brown oil with a molecular weight of about 1,000, a hydrogenation iodine number of 357, a carbon content of 88.5% and a hydrogen content of 11.2%.

EXAMPLE 34

A catalyst suspension is prepared from 100 parts of benzene, 2.2 parts of titanium tetrachloride, 2 parts of aluminum grit, 2 parts of aluminum chloride and 0.5 part of pulverulent sodium chloride in the manner described in Example 32. 160 parts of butadiene is reacted in the presence of this suspension for 40 minutes. The mixture is worked up as in Example 32, 149 parts of cyclododecatriene-(1,5,9), i.e., 93% of the theory, and only 10 parts of a distillation residue being obtained.

EXAMPLE 35

A catalyst suspension is prepared from 90 parts of benzene, 1.14 parts of titanium tetrachloride, 2 parts of aluminum grit, 2 parts of aluminum chloride and 0.5 part of pulverulent sodium chloride. 48 parts of 2,3-dimethyl-butadiene-(1,3) is added to this suspension in the course of 30 minutes, the reaction temperature being kept at 50° C. When all of the 2,3-dimethyl-butadiene-(1,3) has been added, the mixture is stirred for three hours and then the catalyst is destroyed by adding some ether and methanol. The reaction product is combined with 400 parts of acetone and filtered off from insoluble inorganic catalyst portions with suction. After the acetone has been removed by a water wash, the organic phase is evaporated up to a bath temperature of 120° C. at a pressure of 5 mm. Hg. 25 parts of a yellow oil remains as a residue which according to elementary analysis, molecular weight and hydrogenation iodine number is a hydrocarbon with the empirical formula $(C_6H_{10})_7$ having four double bonds per molecule.

EXAMPLE 36

The procedure is the same as in Example 35 and 80 parts of cyclohexadiene-(1,3) is used instead of dimethylbutadiene. By precipitation with acetone, 48 parts of a white polymerized product is obtained. The acetone is extracted with water and the organic phase is separated, dried over calcium chloride and distilled at reduced pressure, 5 parts of dimeric cyclohexadiene being obtained. Analysis shows the hydrocarbon to be a tricyclic compound having two double bonds in the molecule. The compound has a boiling point of 73° to 75° C. at 5 mm. Hg ($n^{20}_D$ 1.5316). 24 parts of higher molecular weight viscous oligomers of cyclohexadiene remains as a nondistillable residue.

EXAMPLE 37

1.14 parts of titanium tetrachloride, 4 parts of zinc powder and 2 parts of aluminum trichloride are ground in 90 parts of benzene in a vibratory mill for 15 hours. The catalyst suspension thus formed is transferred under an argon atmosphere to an agitated vessel provided with a thermometer, reflux condenser and inlet pipe. Butadiene is then led in while stirring. The temperature is kept between 50° and 60° C. by cooling with water. 97 parts of butadiene is reacted in the course of 80 minutes. To complete the reaction, the reaction mixture is stirred for another hour and then introduced into 500 parts of acetone, 15 parts of high molecular weight polybutadiene being precipitated. The acetone solution is extracted with water, dried over calcium chloride and distilled. Distillation gives 65 parts of cyclododecatriene-(1,5,9) and 9 parts of viscous oil of molecular weight 450 with the hydrogenation iodine number 170. Elementary analysis and infra-red spectrum show a polycyclic hydrocarbon with three double linkages and the empirical formula $(C_4H_6)_8$.

By working as described above, but using 8 parts of cadmium instead of zinc and adding as complex-forming agent 1.8 parts of diphenyl ether to the catalyst suspension formed, 45 parts of cyclododecatriene-(1,5,9) and 18 parts of a pale brown oil are obtained.

By working as described above, but replacing the aluminum chloride by an equivalent amount of aluminum bromide or iodide and using 1.8 parts of diphenyl sulfide as complex-forming agent, 90 to 95% of the butadiene reacted is converted into cyclododecatriene-(1,5,9).

Similar yields of cyclododecatriene-(1,5,9) and higher (but still readily soluble) butadiene oligomers are obtained by working as described above, but using as complex-forming substance, 2 parts of anisol, 2 parts of lithium chloride, 2 parts of potassium iodide, 2 parts of magnesium iodide, 2 parts of sodium hydride, 3 parts of diphenylene oxide, 2 parts of quinoline, 0.3 part of triphenylphosphine or 0.5 part of diethyl ether.

EXAMPLE 38

A catalyst suspension is prepared as described in Example 1 from 1.14 parts of titanium tetrachloride, 2 parts of aluminum granules and 2 parts of zinc chloride in 100 parts of chlorobenzene and 165 parts of butadiene is led in in the course of 15 minutes. Upon working up the product, 1 to 2 parts of a mixture of cyclo-octadiene-(1,5) and 1-vinylcyclohexene-(3), 143 parts of cyclododecatriene-(1,5,9), i.e., 89% of the butadiene reacted, and 18 parts of higher molecular weight butadiene oligomers readily soluble in benzene are obtained.

By working as described above, but preparing the catalyst from 1 part of titanium(III) chloride, 2 parts of aluminum, 4 parts of zinc chloride and 1 part of sodium chloride, there are obtained 100 parts of butadiene, 93 parts of cyclododecatriene-(1,5,9) and 6 parts of higher butadiene oligomers.

By following the procedure of Examples 1 and 2 but using other catalyst suspensions, the results set out in the table are obtained:

| Example | Catalyst suspension prepared from— | Yield of cyclododecatriene-(1,5,9) in percent | Yield of higher butadiene oligomers in percent |
|---|---|---|---|
| 39 | 0.4 part of sodium, 1.14 parts of titanium tetrachloride, 5.0 parts of aluminum trichloride, 2.0 parts of sodium chloride, 90.0 parts of benzene. | 30 | 60 |
| 40 | 1.14 parts of titanium tetrachloride, 1.0 parts of beryllium, 2.0 parts of aluminium trichloride, 90.0 parts of benzene. | 58 | 10 |
| 41 | 1.14 parts of titanium tetrachloride, 0.2 part of magnesium, 4.0 parts of aluminum trichloride, 90.0 parts of benzene. | 45 | 12 |
| 42 | 1.14 parts of titanium tetrachloride, 0.5 part of calcium, 4.0 parts of aluminum trichloride, 90.0 parts of benzene. | 50 | 10 |
| 43 | 1.14 parts of titanium tetrachloride, 2.0 parts of aluminum, 0.6 part of carbon tetrachloride, 0.5 part of sodium chloride, 90.0 parts of benzene. | 85 | 14 |
| 44 | 0.57 parts of titanium tetrachloride, 1.0 parts of gallium, 1.0 parts of aluminum trichloride, 0.5 parts of sodium chloride, 90.0 parts of benzene. | 5 | 55 |
| 45 | 1.14 parts of titanium tetrachloride, 5.0 parts of lead, 2.0 parts of aluminum trichloride, 1.0 parts of sodium chloride, 90.0 parts of benzene. | 32 | 32 |
| 46 | 1.14 parts of titanium tetrachloride, 2.0 parts of aluminum, 1.1 parts of tin tetrachloride, 1.0 parts of sodium chloride, 90.0 parts of benzene. | 85 | 8 |
| 47 | 1.14 parts of titanium tetrachloride, 2.0 parts of aluminum, 2.0 parts of antimony trichloride, 90.0 parts of benzene. | 86 | 10 |
| 48 | 1.14 parts of titanium tetrachloride, 8.0 parts of cerium, 2.0 parts of aluminum chloride, 90.0 parts of benzene. | 81 | 8 |
| 49 | 1.14 parts of titanium tetrachloride, 4.0 parts of zinc, 3.0 parts of aluminum bromide, 90.0 parts of benzene. | 94 | 5 |
| 50 | 1.14 parts of titanium tetrachloride, 1.0 parts of aluminum, 0.7 parts of boron trichloride, 90.0 parts of benzene. | 75 | 20 |
| 51 | 1.14 parts of titanium tetrachloride, 2.0 parts of aluminum, 3.0 parts of bismuth trichloride, 90.0 parts of benzene. | 76 | 10 |
| 52 | 1.14 parts of titanium tetrachloride, 2.0 parts of cadmium, 2.0 parts of aluminum chloride, 90.0 parts of benzene. | 10 | 50 |

| Example | Catalyst suspension prepared from— | Yield of cyclododecatriene-(1,5,9) in percent | Yield of higher butadiene oligomers in percent |
|---|---|---|---|
| 53 | 1.14 parts of titanium tetrachloride, 2.0 parts of aluminum, 0.45 parts of silicon tetrachloride, 0.5 parts of sodium chloride, 90.0 parts of benzene. | 80 | 10 |
| 54 | 1.14 parts of titanium tetrachloride, 8.0 parts of tin, 2.0 parts of aluminum chloride, 90.0 parts of benzene, 0.5 parts of sodium chloride. | 1-2 | 86 |
| 55 | 1.14 parts of titanium tetrachloride, 4.0 parts of manganese, 2.0 parts of aluminum chloride, 2.0 parts of diphenylene sulfide, 90.0 parts of benzene. | 73 | 2-3 |
| 56 | 1.14 parts of titanium tetrachloride, 5.0 parts of an about 50% aluminum/vanadium alloy, 2.0 parts of aluminum chloride, 0.5 parts of sodium chloride, 90.0 parts of benzene. | 60 | 35 |
| 57 | 2.0 parts of titanium tetra bromide, 4.0 parts of titanium, 2.0 parts of aluminum chloride, 0.5 parts of sodium chloride, 90.0 parts of benzene. | 40 | 20 |
| 58 | 1.3 parts of $Cl_2Ti(OC_2H_5)_2$, 4.0 parts of zinc, 4.0 parts of aluminum chloride, 1.0 parts of sodium chloride, 90.0 parts of benzene. | 70 | 15 |
| 59 | 1.0 parts of titanium tetrafluoride, 4.0 parts of zinc, 2.0 parts of aluminum chloride, 0.5 parts of sodium chloride, 90.0 parts of benzene. | 83 | 2-4 |

EXAMPLE 60

4.8 parts of iron(III) chloride, 6 parts of aluminum grit, 6 parts of aluminum chloride and 400 parts of benzene are ground for 15 hours in a vibratory mill and then 1.5 parts of powdered sodium chloride are added. The catalyst suspension is then saturated with butadiene and stirred for 15 hours at room temperature. The reaction product has 600 parts of acetone added to it and the deposited catalyst components are filtered off. About 1 to 2 parts of polybutadiene insoluble in acetone are separated at the same time with the inorganic catalyst components. The acetone solution is washed with water, dried over calcium chloride and the mixture distilled. Distillation gives 30 parts of cyclic butadiene oligomers consisting mainly of an equimolecular mixture of trans,trans,trans- and trans,trans,cis-cyclododecatriene-(1,5,9) besides a small amount of an alicyclic hydrocarbon containing vinyl groups and having the empirical formula $(C_4H_6)_3$ and 15 parts of cyclic butadiene oligomers with a boiling point of 90° to 120° C. at $10^{-4}$ mm.Hg. Elementary analysis, molecular weight and hydrogenation iodine number of this fraction show a hydrocarbon with the empirical formula $(C_4H_6)_6$.

7 parts of higher molecular weight butadiene oligomers remains as a non-distillable residue.

By replacing iron(III) chloride by the equivalent amount of iron(III) bromide, similar yields of cyclododecatriene-(1,5,9) and higher butadiene oligomers are obtained.

EXAMPLE 61

A catalyst suspension is prepared from 95 parts of toluene, 1.14 parts of titanium tetrachloride, 0.05 part of lithium, 0.1 part of magnesium, 4 parts of aluminum chloride and 1 part of sodium chloride. 115 parts of butadiene is led in in the course of an hour at 50° C. To complete the reaction, the mixture is stirred for another two hours and then worked up as described in Example 1.

30 parts of trans,trans,cis-cyclododecatriene-(1,5,9) and 20 parts of a high molecular weight hydrocarbon are obtained. Molecular weight, elementary analysis, hydrogenation iodine number and infra-red spectrum show a polycyclic compound with three double linkages in the molecule and the empirical formula $(C_4H_6)_8$.

EXAMPLE 62

A catalyst suspension is prepared as described in Example 1 from 1.14 parts of titanium tetrachloride, 2 parts aluminum grit and 0.6 part of carbon tetrachloride. 68 parts of isoprene is added during the course of 15 minutes with intense cooling. The reaction temperature is kept between 50° and 55° C. After the end of the addition of isoprene, the reaction temperature is maintained for some time and then the catalyst is decomposed by adding 6 parts of ether and 6 parts of methanol.

By working up the reaction product, 54 parts of isoprene oligomers with the boiling point 112° to 150° C. at 8 mm. Hg and a refractive index of $n_D^{20}$ 1.5109 is obtained. The yield is 79% with reference to the isoprene introduced.

EXAMPLE 63

90 parts of a benzene solution containing about 3 millimoles of the complex titanium compound $$C_6H_5TiCl \cdot 2AlCl_3$$

(obtained by refluxing titanium tetrachloride, aluminum and aluminum chloride in benzene for 8 hours) is intimately mixed with 2 parts of zinc and 1 part of aluminum chloride for 3 hours in a vibratory mill.

The catalyst suspension obtained is mixed with 0.2 part of sodium chloride and saturated with butadiene for 25 minutes. The reaction mixture is then worked up as described in Example 1. 90 parts of cyclododecatriene-(1,5,9) and 19 parts of waxy butadiene oligomers are obtained.

Similar results are obtained by using, under otherwise identical conditions 3 millimoles of methyltitanium trichloride or cyclopentadienyltitanium trichloride instead of the above mentioned complex titanium compound, and 2 parts of aluminum chloride.

I claim:

1. A process for the production of oligomers of 1,3-dienes which comprises adding a 1,3-diene to a catalyst system formed by mixing
   (a) a compound selected from the class consisting of iron(III) halides, titanium(IV) acid esters, titanium trihalides, titanium tetrahalides, titanium ester halides and organo-titanium halides; and
   (b) metallic aluminum.

2. A process as claimed in claim 1 wherein an aluminum halide is co-employed in the formation of said catalyst system.

3. A process as claimed in claim 1 wherein a compound capable of forming complexes with aluminum halides is co-employed in the formation of said catalyst system.

4. A process as claimed in claim 1 wherein an aluminum halide and a compound capable of forming complexes with aluminum halides are co-employed in the formation of said catalyst system.

5. A process as claimed in claim 2 wherein said aluminum halide is formed in situ.

6. A process as claimed in claim 4 wherein said aluminum halide is formed in situ.

7. A process as claimed in claim 1 wherein said 1,3-diene is added to said catalyst system and the resulting mixture is maintained at a temperature of −50° to +150° C.

8. A process as claimed in claim 1 wherein said 1,3-diene is added to said catalyst system and reacted to form oligomers in the presence of an aromatic solvent.

9. A process for the production of oligomers of 1,3-diene which comprises adding a 1,3-diene to a catalyst system formed by mixing
   (a) a compound selected from the class consisting of iron(III) halides, titanium(IV) acid esters, titanium trihalides, titanium tetrahalides, titanium ester halides and organo-titanium halides;

(b) at least one metal selected from the class consisting of metals of Groups IA, IIA, IIB, IIIA, IIIB, IVA, IVB, VB and VIIB of the Periodic System of the Elements; and (c) at least one halide of an element selected from the class consisting of the elements of Groups IIB, IIIA, IVA and VA of the Periodic System of the Elements;

at least one of the components (b) and (c) being selected from the class consisting of metallic aluminum and aluminum halide.

10. A process as claimed in claim 9 wherein a halogen-containing compound (a) and aluminum as metal (b) are used, aluminum halide as halide (c) being formed in situ.

11. A process as claimed in claim 9 wherein a compound capable of forming complexes with aluminum halides is co-employed.

12. A process as claimed in claim 9 wherein said 1,3-diene is added to said catalyst system and the resulting mixture is maintained at a temperature of $-50°$ to $+150°$ C.

13. A process as claimed in claim 9 wherein said 1,3-diene is added to said catalyst system and reacted to form oligomers in the presence of an aromatic solvent.

References Cited in the file of this patent

UNITED STATES PATENTS

| | | |
|---|---|---|
| 2,504,016 | Foster | Apr. 11, 1950 |
| 2,918,507 | Kennedy et al. | Dec. 22, 1959 |
| 2,964,574 | Wilke | Dec. 13, 1960 |
| 3,076,045 | Schneider et al. | Jan. 29, 1963 |

UNITED STATES PATENT OFFICE
CERTIFICATE OF CORRECTION

Patent No. 3,149,174                      September 15, 1964

Herbert Mueller

It is hereby certified that error appears in the above numbered patent requiring correction and that the said Letters Patent should read as corrected below.

Column 1, line 70, for "IIA" read -- IIIA --; column 10, lines 30 and 35, for "aligomers", each occurrence, read -- oligomers --; same column 10, line 32, for "nummber" read -- number --; column 12, in the table, under the heading "Catalyst suspension prepared from-" and opposite "Example 40", for "alluminum" read -- aluminum --.

Signed and sealed this 9th day of February 1965.

(SEAL)
Attest:

ERNEST W. SWIDER                      EDWARD J. BRENNER
Attesting Officer                        Commissioner of Patents